May 13, 1947.  A. M. BOUDREAU  2,420,412

BRAKE FOR BABY CARRIAGES, STROLLERS AND THE LIKE

Filed Feb. 19, 1946

INVENTOR.
Alban M. Boudreau
BY his Atty.
John H. McKenna

Patented May 13, 1947

2,420,412

UNITED STATES PATENT OFFICE 2,420,412

BRAKE FOR BABY CARRIAGES, STROLLERS, AND THE LIKE

Alban M. Boudreau, Gardner, Mass., assignor to Hedstrom-Union Company, Gardner, Mass., a corporation of Massachusetts Application February 19, 1946, Serial No. 648,670

5 Claims. (Cl. 188—20)

This invention relates to improvements in vehicle brakes. More especially it provides an improved braking mechanism which has a particular utility in connection with baby carriages, strollers and the like, but which is suitable for embodiment in any type of wheeled vehicle of the general class requiring braking mechanism which is operable from a particular position exteriorly of the vehicle.

Braking mechanisms for vehicles of the general type to which the invention relates ordinarily have a pedal actuator pivotally mounted on an axle of the vehicle for foot actuation of the brake to on and off positions, or have a pivoted hand lever at an elevated position for manual actuation of the brake. In the case of baby carriages, strollers and the like, the pedal actuator customarily is a lever which stands generally in a projecting horizontal position when the brake is off or disengaged so that a downward pressure of a foot can move the lever with an over-center snap action to a generally vertical position for engaging the brake with the vehicle wheels. However, to disengage the brake, the foot must be inserted under the end of the lever and be drawn upward to move the lever back toward horizontal position. Unless care is taken when releasing or disengaging the brake, the end of the pedal lever may dig into the instep of the foot with painful results. In any event, the end of the lever tends to scratch or otherwise mar the shoe or may catch and cause a run in the stocking on the foot which is effecting the disengagement.

In the case of manual brake actuators for baby carriages, strollers and the like, the hand lever usually is mounted well up on the pusher handle within easy reach of the hand of the person operating the vehicle. But the hand lever brake actuators involve connections running up to the lever which, with the lever itself, tend to detract from the appearance of the vehicle, and the hand levers, operating through relatively long connecting members, require more force to operate them than can be applied readily by a lady's hand.

It is among the objects of my present invention to provide a braking mechanism for wheeled vehicles which may be actuated both to apply the brake and to disengage the brake by a generally downward pressure of a foot. I employ a rigid pivoted brake lever which constantly is biased toward engaged position and which includes an actuating bar which conveniently may be depressed by a foot to rock the lever, in opposition to its bias, to a brake-release position in which the actuating bar becomes engaged and held by a latch. When it is desired to engage the brake, a generally downward foot-pressure on the latch effects release of the actuating bar and the lever snaps to braking engagement with wheels of the vehicle.

Another object is to provide a vehicle brake having a wheel-engaging braking member which is a rigid generally U-shaped bar having its U-legs pivoted at opposite sides of the vehicle and having a wheel-engaging foot on each U-leg, the U-bar being biased to wheel-engaging position and there being a latch for securing the U-bar in brake-release position.

It is, moreover, my purpose and object generally to improve the structure and effectiveness of braking mechanisms for wheeled vehicles, and more especially baby carriages and strollers.

Figures 1, 2:
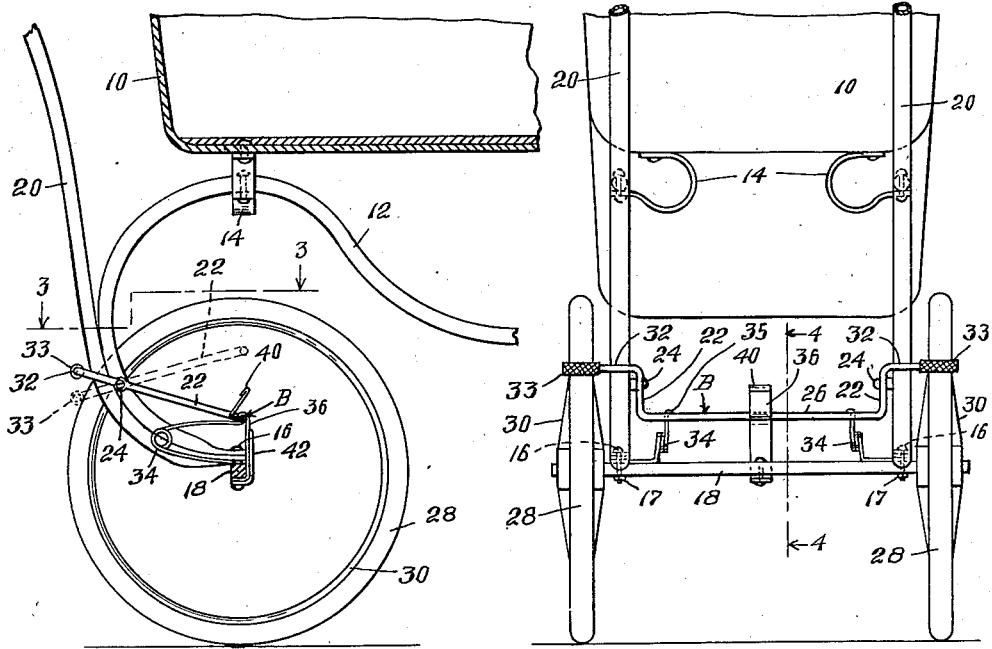
Fig. 1 is a medial vertical cross-sectional view of the rear portion of a stroller equipped with braking mechanism embodying features of the invention.
Fig. 2 is a rear elevation of the stroller of Fig. 1.

Referring to the drawing, the invention is shown as it may be embodied in a stroller which should be regarded as representative of wheeled vehicles of the general class having braking mechanism operable from a position exteriorly of the vehicle.

As herein represented, a stroller body 10 is mounted on a pair of tubular frame elements 12, with suitable springs 14 at the rear resiliently supporting the body on the frame elements, which latter curve downward to connections at 16 on the rear axle 18. A usual generally U-shaped pusher handle 20 has the ends of its U-arms underlying the lower ends of the frame elements 12, so that each frame element 12 and an arm of the pusher handle may be secured to the axle 18 by one of the bolts 16 which extends through the flattened ends of the frame element and pusher arm and through the axle, a nut 17 being threaded on the end of the bolt to effect a secure connection.

Figure 3:
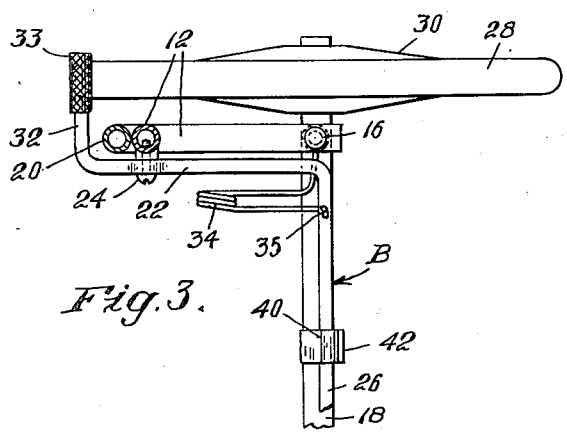
Fig. 3 is a cross-sectional plan view on line 3—3 of Fig. 1.

According to the invention, a rugged and stiff metal rod indicated generally at B is bent to the generally U-shape as best seen in Fig. 3, and this bent generally U-shaped bar B has its U-legs 22 pivoted at 24, one to each of the tubular frame elements 12, with the bridge 26 of the U-bar having generally straight extent between the U-legs 22 and a little above the rear axle 18. The pivots 24 of the U-legs 22 are located so that the U-legs have a common pivotal axis which is inside of the peripheral circle of the rubber tire 28 of each rear wheel 30. Each U-leg has a generally horizontally disposed foot 32 projecting outwardly for engaging a wheel tire 28, each foot 32 preferably being knurled as at 33 to enhance the frictional grip between a foot 32 and a rubber tire 28.

Means is provided for constantly biasing the feet 32 toward a braking engagement with the wheel tires 28 and, when not restrained, the feet 32 forcibly engage the tires to effectively hold the wheels against rotation.

Figure 4:
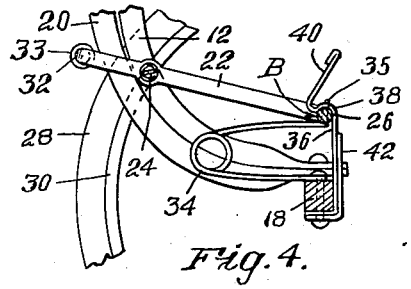
Fig. 4 is a fragmentary cross-sectional view on line 4—4 of Fig. 2, on a larger scale, showing the brake disengaged.
Figure 5:
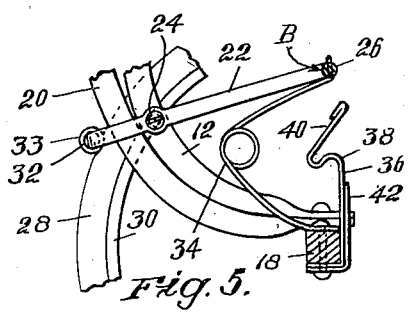
Fig. 5 is a view similar to Fig. 4 but showing the brake engaged.

As herein illustrated, a pair of springs 34 constantly bias the brake bar B about the pivots 24 in direction to cause its knurled feet 33 to engage the rubber tires 28 of wheels 30. The springs conveniently may be of a rat-trap type engaging between the axle 18 and the bar B, with one end of each spring extending to a location where it is clamped between the axle and a pusher arm 29 by the bolt 16, and with the other end of each spring suitably connected to the bridge portion 26 of the bar as at 35, so that the springs urge the bar B counter-clockwise about pivots 24 as viewed in Figs. 1, 4 and 5. While I show a spring 34 adjacent each U-leg 22, the springs may be otherwise arranged, or a single spring of suitable strength may serve.

At a mid-location along the rear axle 18, a strip of resilient metal 36 has its lower end suitably secured to the axle and extends thence vertically upward to a location substantially above the axle where it is formed at 38 with a latching hook for engaging over the bridge 26 of the brake bar B to hold the latter in brake-releasing position against the bias of the springs 34. The hook 38 is open downward and the strip material is bent upon itself at the entrance to the hook and extends obliquely upward and rearwardly from the hook to provide an actuator portion 40 which conveniently may be engaged by a foot to depress the hook latch for releasing the brake bar. Also this actuator portion 40 constitutes a cam surface on which the bridge 26 of the brake bar engages when pressed downward toward the latch, a continued downward movement of the bar camming the latch resiliently rearward until the bar has passed the entrance to the latch groove or hook, after which the latch springs back to its bar-latching position with the bar held by the hook end of the latch.

Preferably a stiffening strip 42 of resilient metal is superimposed on the main latch strip 36 for increasing the effectiveness and durability of the latch.

It will be obvious, from the foregoing description, that the brake bar, when disengaged from the latch, is strongly biased by springs 34 in wheel-braking direction, and the braking feet 33 will be held strongly in braking contact with the rubber tires 28 of wheels 30. When it is desired to release the brake, a mere downward pressure of the foot on bridge 26 of the brake bar can cause the bridge 26 to become engaged by the hook latch 38. In this connection, it should be noted that the bridge 26 of the brake bar may be engaged by the foot anywhere in its relatively long straight extent at the rear of the carriage, and without searching out a small pedal lever. However, to release the brake bar, for a braking of the vehicle wheels, a generally downward and rearward pressure of the foot on latch actuator 40 will disengage the latch and springs 34 immediately respond to snap the brake feet 33 into braking engagement with the wheels.

I claim as my invention:

1. In a vehicle having an axle and a pair of wheels thereon, a brake for said wheels comprising a rigid generally U-shaped member, means pivotally supporting said member between the wheels with the bridge of the U above and in general parallelism with said axle, said pivotal support including axially aligned pivots intermediate the ends of the U-legs of said member, and each said U-leg having a foot thereon adjacent to the periphery of a said wheel, means biasing the U-shaped member about its said pivots and constantly urging said feet toward engagement with the peripheries of said wheels, and means on said axle for releasably holding the U-shaped member against its said bias with the said feet out of engagement with the peripheries of said wheels.

2. In a vehicle having an axle with a pair of wheels thereon and having a frame element extending upward from the axle adjacent to each wheel, a rigid generally U-shaped brake bar pivotally mounted on said frame elements with the bridge portion of the U-bar disposed above and generally parallel with said axle and with a U-leg of the bar adjacent to the inner side of each wheel, said pivotal mount of the brake bar including aligned pivots inward from the end of each U-leg, and each U-leg having a braking foot extending adjacent to the periphery of a said wheel, spring means active between said axle and the brake bar biasing the bar in a direction about its pivot tending to engage said braking feet with the peripheries of said wheels, and a latch on said axle for holding the brake bar against the bias of said spring means, thereby to releasably maintain said braking feet out of wheel engagement.

3. A carriage brake for the rear axle-supported wheels of baby carriages, strollers and the like, comprising a rigid brake bar pivotally mounted between the rear wheels and at an elevation higher than the axle, said brake bar having extent to each side of the pivot and terminating at one side of the pivot in a braking foot adjacent to the periphery of a said rear wheel, resilient means acting on the bar at the other side of its pivot biasing the bar in direction to engage said braking foot with the periphery of the said wheel, and a latch on said axle for releasably holding the brake bar against its said bias with said braking foot out of engagement with the wheel, said brake bar having a portion depressible into engagement with said latch, and said latch having a depressible portion for unlatching the brake bar.

4. In a carriage having a rear axle with a pair of wheels thereon and having a pair of frame elements fixed relative to the axle adjacent to the wheels, a generally U-shaped rigid brake member having its U-legs pivotally mounted on said frame elements on aligned pivots inward from the ends of said U-legs, each U-leg having a braking foot projected outward adjacent to the periphery of a said rear wheel, spring means biasing the brake member about its said pivots in direction tending to engage said braking feet with the peripheries of said wheels, a resilient latch on the axle for engaging the bridge portion of the U-shaped brake member thereby to releasably hold the brake member against its said bias with the braking feet out of wheel engagement, said latch being responsive to a generally downward foot-pressure to release the brake member whereby the said spring means re-acts to move said braking feet into wheel engagement.

5. In a carriage having an axle with a pair of wheels thereon, a braking mechanism for said wheels, comprising a rigid brake bar having two generally parallel mounting portions and a relatively long portion connecting said mounting portions, means for mounting the mounting portions on aligned pivots intermediate of their ends with said connecting portion above and parallel to the axle, each said mounting portion having a braking foot projecting adjacent to the periphery of a said wheel, spring means biasing the brake bar counter-clockwise about the said pivots, thereby tending constantly to urge said braking feet toward wheel engagement, and a resilient latch on the axle for engaging and holding the brake bar against its said bias with the braking feet out of wheel engagement, said connecting portion of the brake bar being adapted for foot-depression into latched position, and said resilient latch being adapted for foot-depression to release the latch.

ALBAN M. BOUDREAU.